United States Patent
Suematsu (10) Patent No.: US 7,519,332 B1
(45) Date of Patent: Apr. 14, 2009

(54) RADIO-FREQUENCY RADIOCOMMUNICATION APPARATUS

(75) Inventor: Eiji Suematsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/539,792

(22) Filed: Mar. 31, 2000

(30) Foreign Application Priority Data

Mar. 31, 1999 (JP) ................................. 11-094182

(51) Int. Cl.
*H04B 1/40* (2006.01)

(52) U.S. Cl. .................. 455/76; 455/561; 455/552.1; 455/557; 455/86; 342/359; 342/42; 342/73; 342/14; 343/880

(58) Field of Classification Search ............ 455/76, 455/90, 196.1, 197.1, 258, 255, 230, 147, 455/561, 552.1, 557, 86; 342/359, 42, 73, 342/147, 14, 880; 701/220, 221, 213; 343/713, 343/766, 880
See application file for complete search history.

(56) References Cited

U.S. PATENT DOCUMENTS

| | | | | | |
|---|---|---|---|---|---|
| 4,153,884 | A | * | 5/1979 | Ikeguchi et al. | 331/1 A |
| 4,194,151 | A | * | 3/1980 | Gregersen et al. | 331/2 |
| 4,618,997 | A | * | 10/1986 | Imazeki et al. | 455/183.2 |
| 4,688,261 | A | * | 8/1987 | Killoway et al. | 455/152.1 |
| 5,077,560 | A | * | 12/1991 | Horton et al. | 342/359 |
| 5,263,178 | A | * | 11/1993 | Liukkonen | 327/231 |
| 5,302,918 | A | * | 4/1994 | Sturzebecher et al. | 331/10 |
| 5,465,418 | A | * | 11/1995 | Zhou et al. | 455/323 |
| 5,519,885 | A | * | 5/1996 | Vaisanen | 455/76 |
| 5,574,985 | A | * | 11/1996 | Ylikotila | 455/183.2 |
| 5,579,012 | A | * | 11/1996 | Iwakuni et al. | 342/117 |
| 5,669,067 | A | * | 9/1997 | Mambo | 455/76 |
| 5,678,171 | A | * | 10/1997 | Toyama et al. | 725/76 |
| 5,701,583 | A | * | 12/1997 | Harbin et al. | 455/25 |

(Continued)

FOREIGN PATENT DOCUMENTS

JP 49-25775 7/1974

(Continued)

OTHER PUBLICATIONS

Japanese Office Action.

(Continued)

*Primary Examiner*—Nghi H Ly
(74) *Attorney, Agent, or Firm*—Birch, Stewart, Kolasch & Birch LLP (57) ABSTRACT

A radiocommunication apparatus includes a transmitting device and a receiving device. The transmitting device includes a first local oscillation section for selecting a frequency for a first local oscillation signal from a plurality of predetermined frequencies in order to output the first local oscillation signal, and a first frequency mixing section for mixing an input signal and the first local oscillation signal, thereby forming a transmission signal. The receiving device includes a second local oscillation section for selecting a frequency for a second local oscillation signal from the plurality of predetermined frequencies in order to output the second local oscillation signal, and a second frequency mixing section for mixing a received signal and the second local oscillation signal, thereby forming an output signal. The frequency for the first local oscillation signal and the frequency for the second local oscillation signal are selected such that the frequency for the first local oscillation signal and the frequency for the second local oscillation signal are identical to each other.

12 Claims, 8 Drawing Sheets

U.S. PATENT DOCUMENTS

| | | | |
|---|---|---|---|
| 5,712,602 A | | 1/1998 | Suematsu |
| 5,748,049 A | * | 5/1998 | Bayruns et al. ......... 331/116 FE |
| 5,748,151 A | * | 5/1998 | Kingston et al. ............ 343/753 |
| 5,771,015 A | * | 6/1998 | Kirtman et al. ............. 342/359 |
| 5,809,457 A | * | 9/1998 | Yee et al. ................... 701/220 |
| 5,913,174 A | * | 6/1999 | Casarez et al. .............. 455/557 |
| 5,926,127 A | * | 7/1999 | Schmidt et al. ............... 342/70 |
| 5,982,333 A | * | 11/1999 | Stillinger et al. ............ 343/766 |
| 6,008,750 A | * | 12/1999 | Cottle et al. ................. 342/42 |
| 6,046,707 A | * | 4/2000 | Gaughan et al. ............ 343/895 |
| 6,075,996 A | * | 6/2000 | Srinivas ................... 455/552.1 |
| 6,111,542 A | * | 8/2000 | Day et al. ................... 342/359 |
| 6,236,368 B1 | * | 5/2001 | Johson ....................... 343/702 |
| 6,252,561 B1 | * | 6/2001 | Wu et al. .................... 343/866 |
| 6,259,933 B1 | * | 7/2001 | Bambridge et al. ......... 343/702 |
| 6,267,339 B1 | * | 7/2001 | Gates et al. ............. 248/218.4 |
| 6,278,867 B1 | * | 8/2001 | Northcutt et al. .............. 331/16 |
| 6,342,870 B1 | * | 1/2002 | Mehrkens et al. ........... 343/891 |
| 6,462,775 B1 | * | 10/2002 | Loyd et al. .................. 348/151 |
| 6,532,359 B1 | * | 3/2003 | Lin ......................... 455/277.1 |

FOREIGN PATENT DOCUMENTS

| | | |
|---|---|---|
| JP | 03-227124 | 10/1991 |
| JP | 08-107308 | 4/1996 |
| JP | 08-316904 | 11/1996 |
| JP | 09-018370 | 1/1997 |
| JP | 09-206329 | 12/1997 |
| JP | 10-170647 | 6/1998 |

OTHER PUBLICATIONS

Japanese Office Action, no date.
H. Nakakita et al., IEEE MTT-S Digest, pp. 1143-1146 (1997).

* cited by examiner

RADIO-FREQUENCY RADIOCOMMUNICATION APPARATUS

BACKGROUND OF THE INVENTION

1. Field of the Invention

The present invention relates to a radio-frequency radiocommunication apparatus for transmitting/receiving radiocommunications in a range from a microwave band to a milli-wave band.

2. Description of the Related Art

Figure 7:
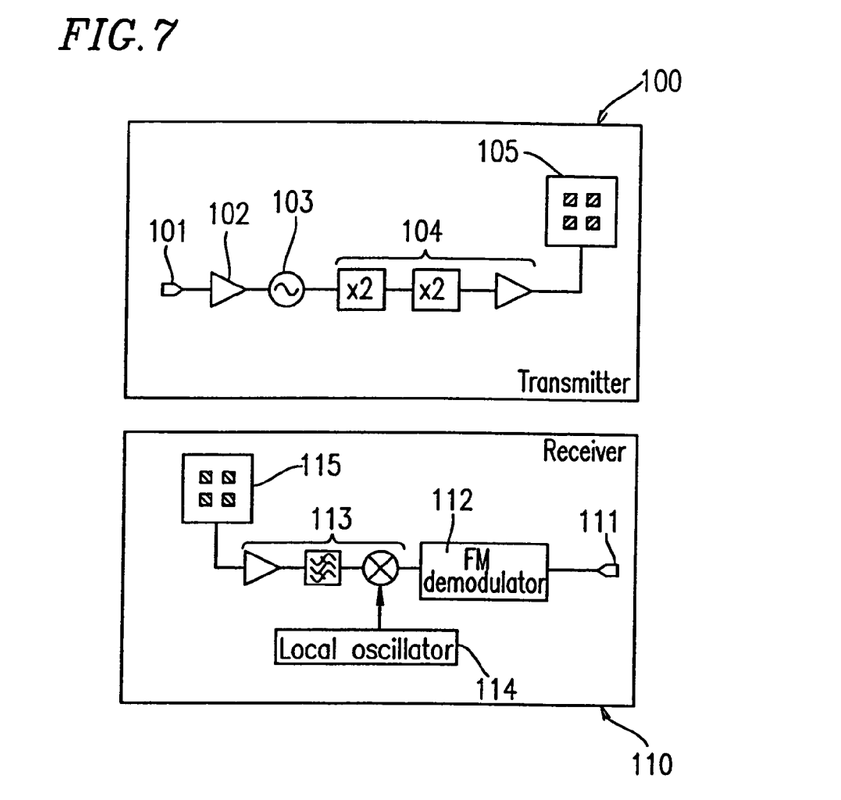
FIG. 7 is a block diagram showing the conventional radio-frequency radiocommunication apparatus.

A radiocommunication apparatus for transmitting/receiving radiocommunications in a range from a microwave band to a milli-wave band is structured, for example, as shown in FIG. 7. In FIG. 7, a transmitter 100 includes a baseband input terminal 101, a baseband amplifier 102, an FM modulator 103 using a voltage controlled oscillator, a frequency up-converter 104, and an antenna 105.

On the other hand, a receiver 110 includes a baseband output terminal 111, an FM demodulator section 112, a frequency down-converter 113, a local oscillation section 114, and an antenna 115.

In the transmitter 100, for example, a channel signal representing a image and a sound is input to the baseband input terminal 101, and this signal is amplified by the baseband amplifier 102. The amplified signal is FM-modulated by the FM modulator 103, and the FM-modulated signal is up-converted to a milli-wave band signal by the frequency up-converter 104. This milli-wave band signal is radiated from the antenna 105 into the air.

On the other hand, in the receiver 110, a milli-wave band signal is received by the antenna 115, and down-converted by the frequency down-converter 113 into a low-frequency signal. The low-frequency signal is demodulated by the FM demodulator section 112, and the demodulated signal is output from the baseband output terminal 111. The signal output from the terminal 111 is sent to a display apparatus or a monitor apparatus to reproduce the image and the sound.

The transmitter 100 and the receiver 110 each include a local oscillator (not shown in the transmitter 100) for up-converting an FM output from the FM modulator 103 to a milli-wave band signal or for down-converting a milli-wave band signal to a low-frequency signal. The conventional local oscillator has a fixed oscillation frequency, and has no function for switching an oscillation frequency. Thus, the frequency of a milli-wave band signal transmitted between the transmitter 100 and the receiver 110 is fixed to a predetermined value.

Figure 8:
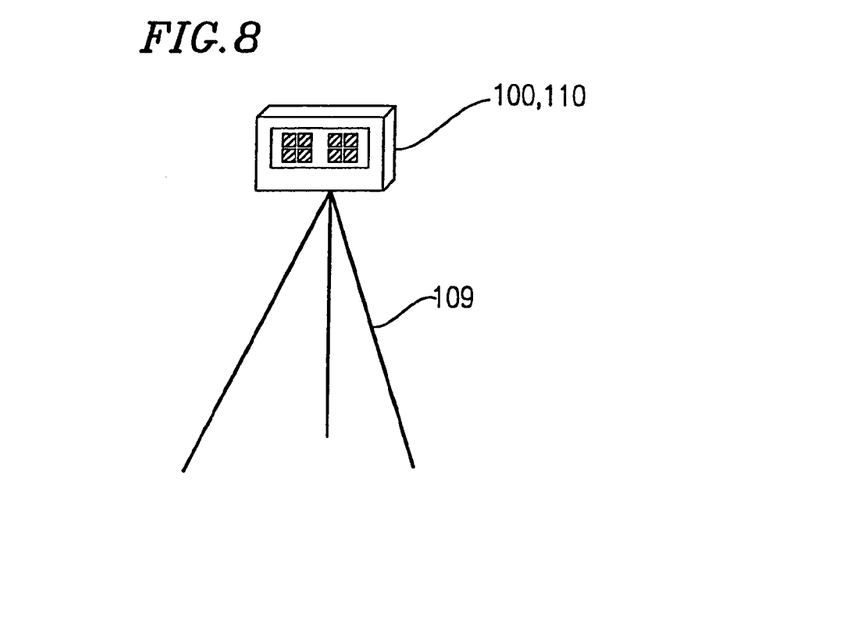
FIG. 8 shows an exemplary application of the conventional radiocommunication apparatus.

Furthermore, although the conventional antennas 105 and 115 are flat antennas, both of them have no function for adjusting the direction thereof. Therefore, for example as shown in FIG. 8, the transmitter 100 and/or the receiver 110 are mounted on a three-leg stand 109, and the direction of each of the transmitter 100 and the receiver 110 is adjusted by adjusting the three-leg stand 109.

However, in the conventional radiocommunication apparatus as described above, the receiver often receives unintended milli-wave band signals having the same frequency as that of an intended signal, whereby radio interference is caused in the receiver. When such radio interference is caused, effects of the radio interference can be reduced by changing a transmission route for a radio signal between the transmitter and the receiver. However, the transmitter and/or the receiver are contained in a metal case, and the metal case containing the transmitter and/or the receiver is supported on a three-leg stand so as to fixed thereto. Such a radiocommunication apparatus has the height of at least 100 cm or more, and the width and the length of 20 cm or more. Thus, in order to carry and =manipulate such a large apparatus, a large manpower is required.

Furthermore, the conventional radiocommunication apparatus cannot transmit/receive radio waves at a level higher than the top of the three-leg stand. Thus, even when the transmission route for radio signals is changed, the radio signals are often blocked by various obstacles.

Furthermore, in the conventional radiocommunication apparatus, a display apparatus is provided separate from the transmitter and/or the receiver. Accordingly, it is difficult for a user to carry the radiocommunication apparatus and the display apparatus with her/him. In addition, the movable range of the transmitter and/or the receiver is restricted. Thus, there is a limitation in preventing radio interference by the movement of the transmitter and/or the receiver.

SUMMARY OF THE INVENTION

According to one aspect of the present invention, a radiocommunication apparatus includes a transmitting device and a receiving device. The transmitting device includes a first local oscillation section for selecting a frequency for a first local oscillation signal from a plurality of predetermined frequencies in order to output the first local oscillation signal, and a first frequency mixing section for mixing an input signal and the first local oscillation signal, thereby forming a transmission signal. The receiving device includes a second local oscillation section for selecting a frequency for a second local oscillation signal from the plurality of predetermined frequencies in order to output the second local oscillation signal, and a second frequency mixing section for mixing a received signal and the second local oscillation signal, thereby forming an output signal. The frequency for the first local oscillation signal and the frequency for the second local oscillation signal are selected such that the frequency for the first local oscillation signal and the frequency for the second local oscillation signal are identical to each other.

In one embodiment of the present invention, the radiocommunication apparatus receives a control signal from outside. In response to the control signal, the transmitting device selects the frequency for the first local oscillation signal, and the receiving device selects the frequency for the second local oscillation signal.

In another embodiment of the present invention, the first local oscillation section and the second local oscillation section each include a phase locked oscillator.

In still another embodiment of the present invention, the first local oscillation section and the second local oscillation section each include a multiplier or an injection locked oscillator.

According to another aspect of the present invention, a transmitter for transmitting a transmission signal to a receiver includes a first local oscillation section for selecting a frequency for a first local oscillation signal from a plurality of predetermined frequencies in order to output the first local oscillation signal, and a first frequency mixing section for mixing an input signal and the first local oscillation signal, thereby forming a transmission signal. The receiver includes a second local oscillation section for selecting a frequency for a second local oscillation signal from the plurality of predetermined frequencies in order to output the second local oscillation signal, and a second frequency mixing section for mixing a received signal and the second local oscillation signal, thereby forming an output signal. The frequency for the first local oscillation signal and the frequency for the second local oscillation signal are selected such that the frequency for the first local oscillation signal and the frequency for the second local oscillation signal are identical to each other.

In one embodiment of the present invention, the transmitter receives a control signal from outside, and in response to the control signal, the transmitter selects the frequency for the first local oscillation signal.

In another embodiment of the present invention, the first local oscillation section includes a phase locked oscillator.

In still another embodiment of the present invention, the first local oscillation section includes a multiplier or an injection locked oscillator.

According to still another aspect of the present invention, a receiver for receiving a transmission signal from a transmitter includes a second local oscillation section for selecting a frequency for a second local oscillation signal from the plurality of predetermined frequencies in order to output the second local oscillation signal, and a second frequency mixing section for mixing a received signal and the second local oscillation signal, thereby forming an output signal. The transmitter includes a first local oscillation section for selecting a frequency for a first local oscillation signal from a plurality of predetermined frequencies in order to output the first local oscillation signal, and a first frequency mixing section for mixing an input signal and the first local oscillation signal, thereby forming a transmission signal. The frequency for the first local oscillation signal and the frequency for the second local oscillation signal are selected such that the frequency for the first local oscillation signal and the frequency for the second local oscillation signal are identical to each other.

In one embodiment of the present invention, the receiver receives a control signal from outside and, in response to the control signal, the receiver selects the frequency for the second local oscillation signal.

In another embodiment of the present invention, the second local oscillation section includes a phase locked oscillator.

In still another embodiment of the present invention, the second local oscillation section includes a multiplier or an injection locked oscillator.

According to still another aspect of the present invention, a radiocommunication apparatus includes a directional antenna including a transmitter and/or a receiver integrated therewith, a dielectric case for containing the directional antenna, and a supporting section for supporting the dielectric case such that a direction of the dielectric case can be changed.

In one embodiment of the present invention, the transmitter is the transmitter of claim 5.

In another embodiment of the present invention, the receiver is the receiver of claim 9.

In still another embodiment of the present invention, the radiocommunication apparatus includes a lock section for locking the direction of the dielectric case.

In still another embodiment of the present invention, a portion of the dielectric case which faces a back face of the directional antenna opposite to a radio wave receiving face thereof is made of a metal.

In still another embodiment of the present invention, the transmitter has a plane circuit or a dielectric waveguide.

In still another embodiment of the present invention, the receiver has a plane circuit or a dielectric waveguide.

In still another embodiment of the present invention, the supporting section includes a driving section for changing the direction of the dielectric case.

In still another embodiment of the present invention, the driving section includes a control section; and the control section receives a control signal from outside, and the driving section changes the direction of the dielectric case under the control of the control section based on the control signal.

In still another embodiment of the present invention, a portion of the dielectric case which faces a radio wave receiving face of the directional antenna is provided with a dielectric lens.

In still another embodiment of the present invention, the radiocommunication apparatus is attached to a display apparatus or an air conditioner.

According to the present invention, the local oscillation frequency is switched to select any of a plurality of channels, and a communication can be established between the transmitter and the receiver through the selected channel. For example, since the milli-wave band is a wide band, a number of channels can be set within the milli-wave band. Thus, radio interference can be prevented by selecting an optimum channel among the number of channels.

The control signal from outside is obtained from a remote controller of, e.g., a television receiving apparatus or a handyphone. The frequency of the local oscillation signal is switched by utilizing the control signal.

When the milli-wave band is utilized, for example, the size and the weight of the transmitting/receiving device can be reduced. Accordingly, the transmitting/receiving device can be integrated with a directional antenna. According to the present invention, the directional antenna is contained in the dielectric case, and the direction of the directional antenna thus can be changed by changing the direction of the dielectric case. Thus, the directional antenna can be directed to a direction less susceptible to effects of radio interference by changing the direction of the dielectric case by the fingertip. Furthermore, when a radio signal is transmitted between two radio-frequency radiocommunication apparatus, a transmission route for the radio signal can be easily changed.

Thus, the invention described herein makes possible the advantage of providing a radio-frequency radiocommunication apparatus having an anti radio interference function, in which the direction of an antenna can be adjusted by changing the position and/or the direction of the apparatus itself.

This and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
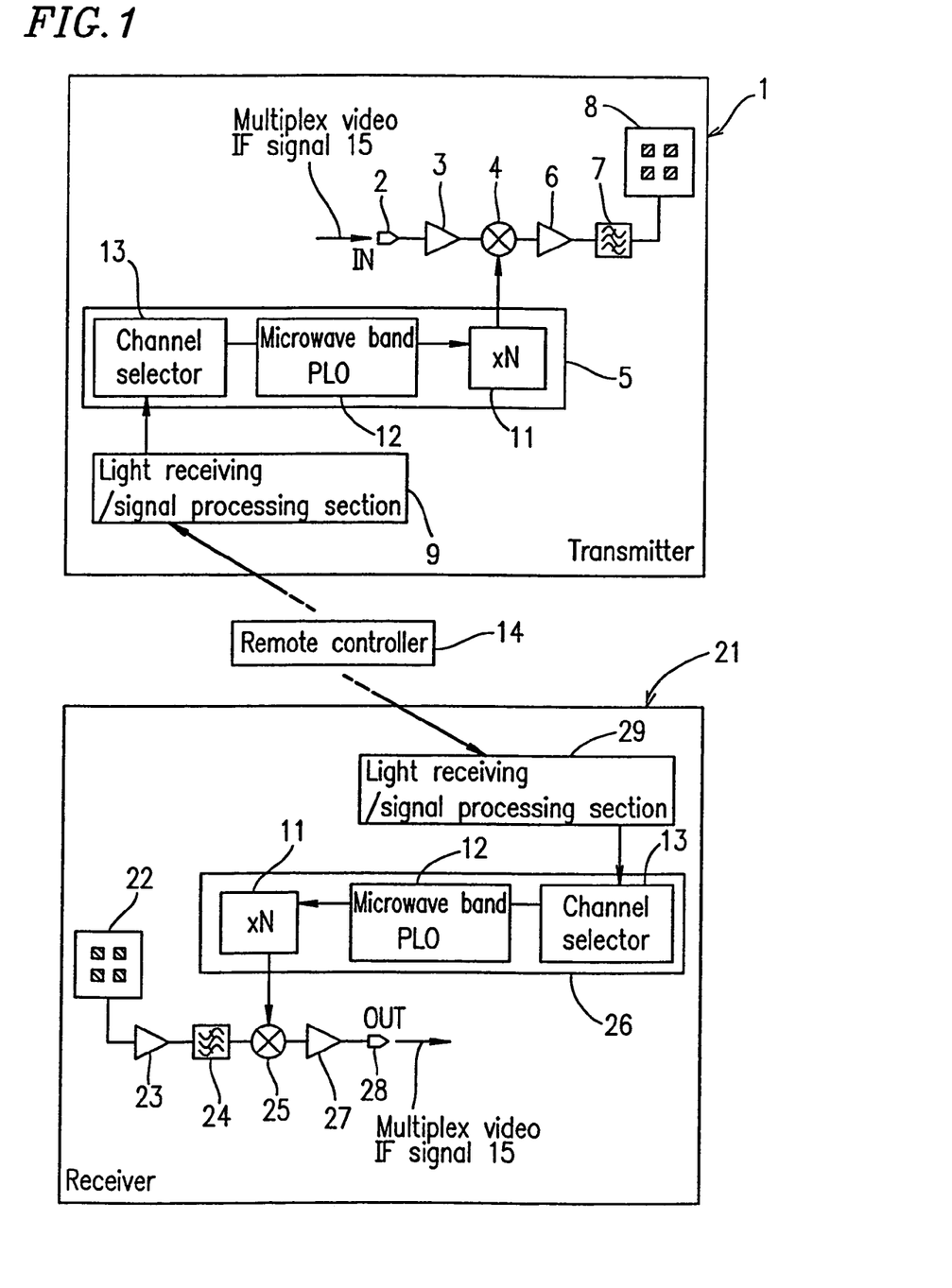
FIG. 1 is a block diagram showing radio-frequency radiocommunication apparatus according to embodiment 1 of the present invention.

FIG. 1 is a block diagram showing radio-frequency radiocommunication apparatus according to embodiment 1 of the present invention. In embodiment 1, a milli-wave band video multiplex transmission which is performed inside a house is described.

The milli-wave band video multiplex transmission is generally used for transmitting data of the video media such as ground wave television broadcasting, satellite TV broadcasting, CATV, etc. In embodiment 1, a radio wave signal of the ground wave television broadcasting, an intermediate frequency signal of the satellite TV broadcast, and a transmission signal of the CATV are each directly up-converted to a milli-wave band signal at the transmitter side, and the transmitter outputs the milli-wave band signal as it is. On the other hand, a milli-wave band signal is received by a receiver and down-converted into a radio wave signal of the ground wave television broadcasting, a intermediate frequency signal of the satellite TV broadcasting, or a transmission signal of the CATV. The down-converted signal is demodulated and processed by a tuner, thereby demodulating the image signal. The image signal is sent to a television receiver apparatus, and the television receiver apparatus reproduces an image from the image signal.

The radio wave signal of the ground wave television broadcast, the intermediate frequency signal of the satellite TV broadcast, and the transmission signal of the CATV each have a frequency band from about 100 MHz to about 2 GHz. Such a signal is herein referred to as a multiplex video intermediate frequency signal (IF signal) 15.

In the transmitter 1, the IF signal 15 is input to an input terminal 2, and amplified and level-adjusted by an IF amplifier 3. The amplified and level-adjusted IF signal 15 and a signal from a local oscillator 5 are frequency-mixed by a frequency mixer 4 so as to be frequency-converted into a milli-wave band signal. This milli-wave band signal is amplified by a milli-wave band amplifier 6, has its unwanted components removed by a bandpass filter 7, and is thereafter radiated from a transmission antenna 8 into the air.

On the other hand, in the receiver 21, the milli-wave band signal from the transmitter 1 is received by the receiving antenna 22, and amplified by a milli-wave band low noise amplifier 23. Then, unwanted components of the amplified milli-wave band signal are removed by a filter 24. The resultant milli-wave band signal and a signal from a local oscillator 26 are frequency-mixed by a frequency mixer 25, so as to be frequency-converted into an IF signal 15. The IF signal 15 is amplified by an amplifier 27, and transmitted from an output terminal 28 to a tuner (not shown). The tuner demodulates and processes the IF signal 15, thereby forming an image signal. The image signal is input to a television receiver apparatus (not shown), and an image is displayed in the television receiver apparatus based on the image signal.

As shown in FIG. 1, the local oscillator 5 of the transmitter 1 and the local oscillator 26 of the receiver 21 have the same structure, and each include a frequency multiplier 11, a microwave band phase locked oscillator (PLO) 12, and a channel selector 13. The frequency multiplier 11 and the phase locked oscillator 12 each may include a buffer amplifier. Furthermore, a plurality of frequency multipliers 11 and/or a plurality of phase locked oscillators 12 may be provided.

The local oscillator 5 of the transmitter 1 and the local oscillator 26 of the receiver 21 each can selectively generate local oscillation signals having different frequencies, each of which corresponds to a single channel or a plurality of channels for preventing radio interference, and output the generated local oscillation signals to the frequency mixers 4 and 25, respectively.

Furthermore, the transmitter 1 and the receiver 21 have light receiving/signal processing sections 9 and 29, respectively. A remote controller 14 is used for controlling a television receiver apparatus, a video recorder, or the like, from a distant place. In response to an input operation which has been predetermined so as to sequentially select any of a plurality of channels for preventing radio interference, the remote controller 14 generates a control signal indicative of the selected channel for preventing radio interference. Then, the remote controller 14 converts the control signal into an optical signal, and outputs the optical signal. The light receiving/signal processing section 9 of the transmitter 1 and the light receiving/signal processing section 29 of the receiver 21 each receive the optical signal, convert it into a control signal, and input the control signal into the local oscillator 5 and 26, respectively.

In each of the local oscillators 5 and 26, the control signal from the light receiving/signal processing section 9 or 29 is input into the channel selector 13. The channel selector 13 determines a channel for preventing radio interference based on the control signal, and indicates the channel to the phase locked oscillator 12. The phase locked oscillator 12 shifts the frequency of a oscillation signal according to the indicated channel, and outputs the oscillation signal to the multiplier 11. The multiplier 11 frequency-converts the oscillation signal into a local oscillation signal having a frequency identical to that of the channel, and outputs the local oscillation signal for preventing radio interference to the frequency mixer 4 or 25.

Thus, respective channels for preventing radio interference are sequentially selected by the operation of the remote controller 14, and the selected channels are indicated to the transmitter 1 and the receiver 21, whereby respective local oscillation signals having frequencies corresponding to the respective selected channels for preventing radio interference are sequentially input to the frequency mixers 4 and 25, respectively. In the transmitter 1, the frequency mixer 4 generates a milli-wave band signal corresponding to a channel for preventing radio interference, and the milli-wave band signal corresponding to this channel is transmitted from the transmitter 1. In the receiver 21, on the other hand, the frequency mixer 25 generates an IF signal 15 from the milli-wave band signal corresponding to the channel for preventing radio interference.

In embodiment 1, for example, 12 channels may be preset for preventing radio interference. With such an arrangement, even when radio interference occurs during a communication between the transmitter 1 and the receiver 21 via a normally-employed channel due to a disturbing signal having the same frequency as that of the normally-employed channel, effects of the radio interference can be avoided by selecting a channel for preventing radio interference by switching channels using the remote controller 14.

As described above, according to embodiment 1, even when a disturbing signal is incidentally introduced into the communication between the transmitter 1 and the receiver 21, effects of radio interference can be avoided by switching channels by the remote controller 14. Regarding the frequencies of the respective channels for preventing radio interference, it is desirable that an initial shift width of the frequency with respect to the frequency of the normally-employed channel is as large as 500 MHz to 1 GHz, and the frequency thereafter shifts away from the frequency of the normally-employed channel by 10 MHz or more for every shift. Furthermore, it is preferable that differences between the frequencies of the adjoining channels are not constant. However, in the case where the variable frequency range for the local oscillation frequency or the frequency bandwidth is restricted, the initial shift width of the frequency may be set to 500 MHz or less.

Furthermore, by providing the communication apparatus with a mechanism for displaying on a display screen of a television receiver apparatus a message that urges a user to switch the current channel to another channel for preventing radio interference when an appropriate image cannot be displayed on the display screen due to radio interference, the apparatus becomes easier for the user to operate.

Furthermore, the transmitter 1 and the receiver 21 of embodiment 1 each may be a transceiver.

Furthermore, when channel frequencies f1 and f2 are used for normal communications between a pair of a transmitter and a receiver, a plurality of channels for preventing radio interference may be provided to each of the channel frequencies f1 and f2.

Furthermore, in embodiment 1, the milli-waveband video multiplex transmission has been used for describing the present invention. However, the present invention is applicable to a microwave band transmission, a high-speed radio LAN apparatus, or a high-speed radio access terminal apparatus.

Furthermore, in place of the frequency multiplier 11, an injection locked oscillator which operates according to and in synchronization with an output signal from a microwave band phase locked oscillator may be used.

Furthermore, although channels are switched using a remote controller of a television receiver apparatus or a video recorder in embodiment 1, a control signal transmitted from a cordless telephone, a handyphone (e.g., a PHS (personal handyphone system)), or the like, is utilized for switching channels for preventing radio interference. Alternatively, any control apparatus may be used for switching channels.

Embodiment 2

Figure 2A:
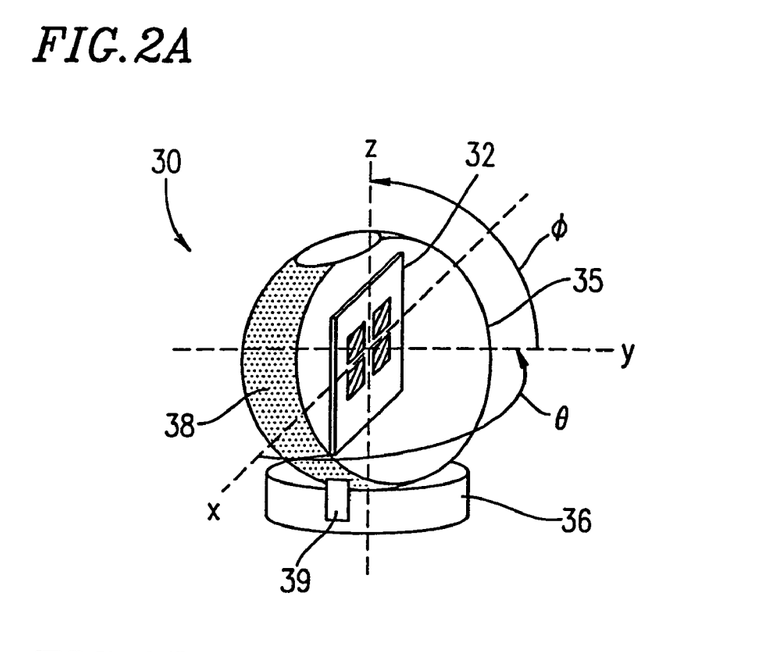
FIG. 2A is a perspective view showing a radio-frequency radiocommunication apparatus according to embodiment 2 of the present invention.
Figure 2B:
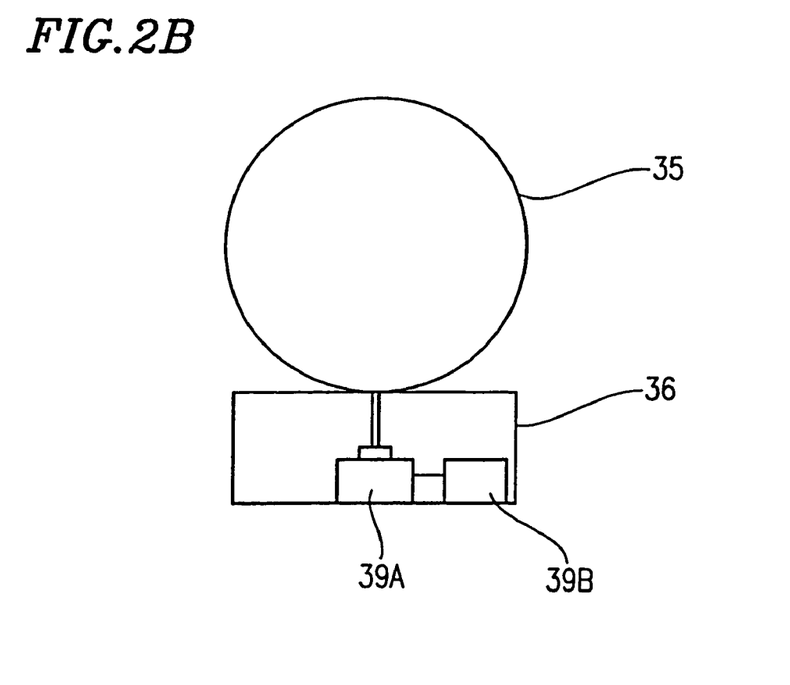
FIG. 2B is a cross-sectional view of the radio-frequency radiocommunication apparatus shown in FIG. 2A.
Figure 2C:
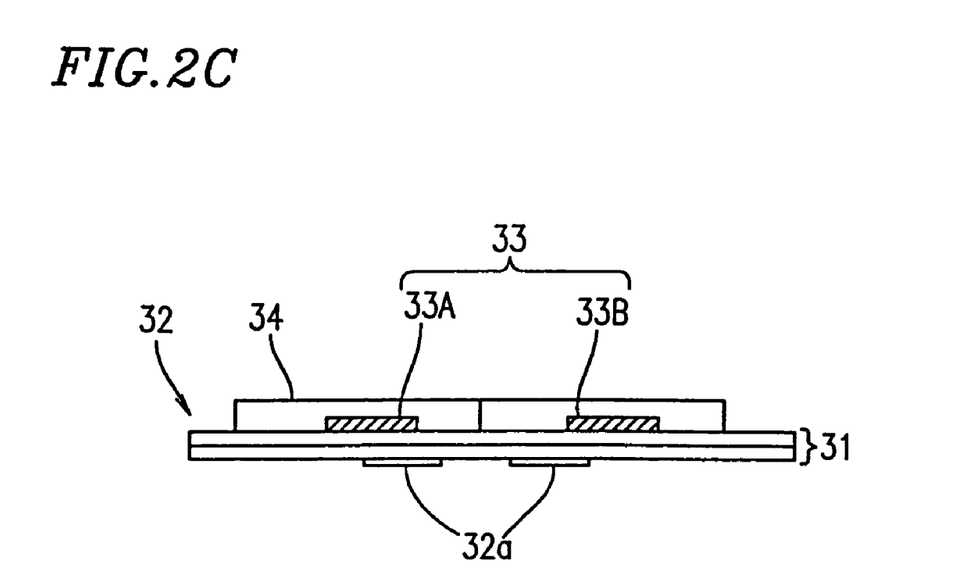
FIG. 2C is a cross-sectional view of a flat antenna of the radio-frequency radiocommunication apparatus shown in FIG. 2A.
Figure 2D:
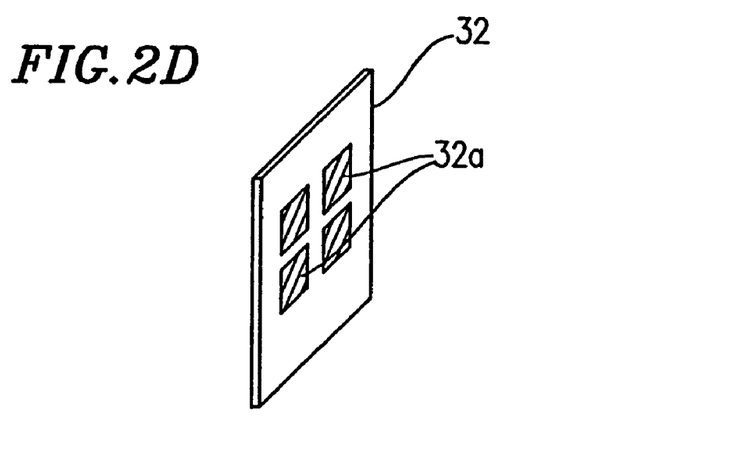
FIG. 2D is a perspective view showing the flat antenna of FIG. 2C.

FIGS. 2A, 2B, 2C, and 2D show a radio-frequency radiocommunication apparatus according to embodiment 2 of the present invention. FIG. 2A is a perspective view showing a radio-frequency radiocommunication apparatus 30. FIG. 2B is a cross-sectional view of a turntable 36 of the radio-frequency radiocommunication apparatus 30. FIG. 2C is a cross-sectional view of a flat antenna 32 of the radio-frequency radiocommunication apparatus 30. FIG. 2D is a perspective view showing the flat antenna 32 of the radio-frequency radiocommunication apparatus 30. In embodiment 2, a milli-wave band video multiplex transmission which is performed inside a house is described.

As shown in FIG. 2C, antenna elements 32a are formed on a front face of the dielectric substrate 31, and a transmitting/receiving device 33 including a transmitting device 33A and a receiving device 33B is formed on a back face of the dielectric substrate 31 and is enclosed by a cover 34. Thus, the transmitting/receiving device 33 is integrated with the flat antenna 32.

The transmitting device 33A and the receiving device 33B each consist of a plane circuit or a dielectric waveguide, whereby the size and the weight thereof are reduced.

In FIG. 2C, the flat antenna 32 includes both of the transmitting device 33A and the receiving device 33B. However, the flat antenna 32 may include only one of the transmitting device 33A and the receiving device 33B. In such a case, the radio-frequency radiocommunication apparatus 30 is used as a transmitter or a receiver.

As shown in FIG. 2A, the flat antenna 32 is contained together with a transmitting/receiving device 33 in a dielectric case 35 having the shape of a round globe (or a rectangular parallelepiped). The flat antenna 32 has a directivity such that a front face thereof receives radio waves. At the back face side of the flat antenna 32, a wall surface of the dielectric case 35 is covered with a metal film (e.g., aluminum) having a thickness of several micrometers or with a metal element 38 made of a conductive plate or the like.

Furthermore, the dielectric case 35 is rotatably supported on the turntable 36 such that the dielectric case 35 is rotated by the turntable 36 in two directions within a range of an angle range θ in the horizontal direction and an angle range φ in the vertical direction. In addition, the turntable 36 may have a lock mechanism 39 for enabling or disabling the rotation of the dielectric case 35.

The size of the flat antenna 32 including the cover 34, etc., is such that one side is as small as about 2 to 5 cm. According to the present invention, the weight of the radiocommunication apparatus 30 is about 100 g at maximum, and the diameter of the dielectric case 35 is about 4 to 10 cm. Thus, the direction of the flat antenna 32 can be adjusted by only touching and rotating the dielectric case 35 with a fingertip.

Figure 3:
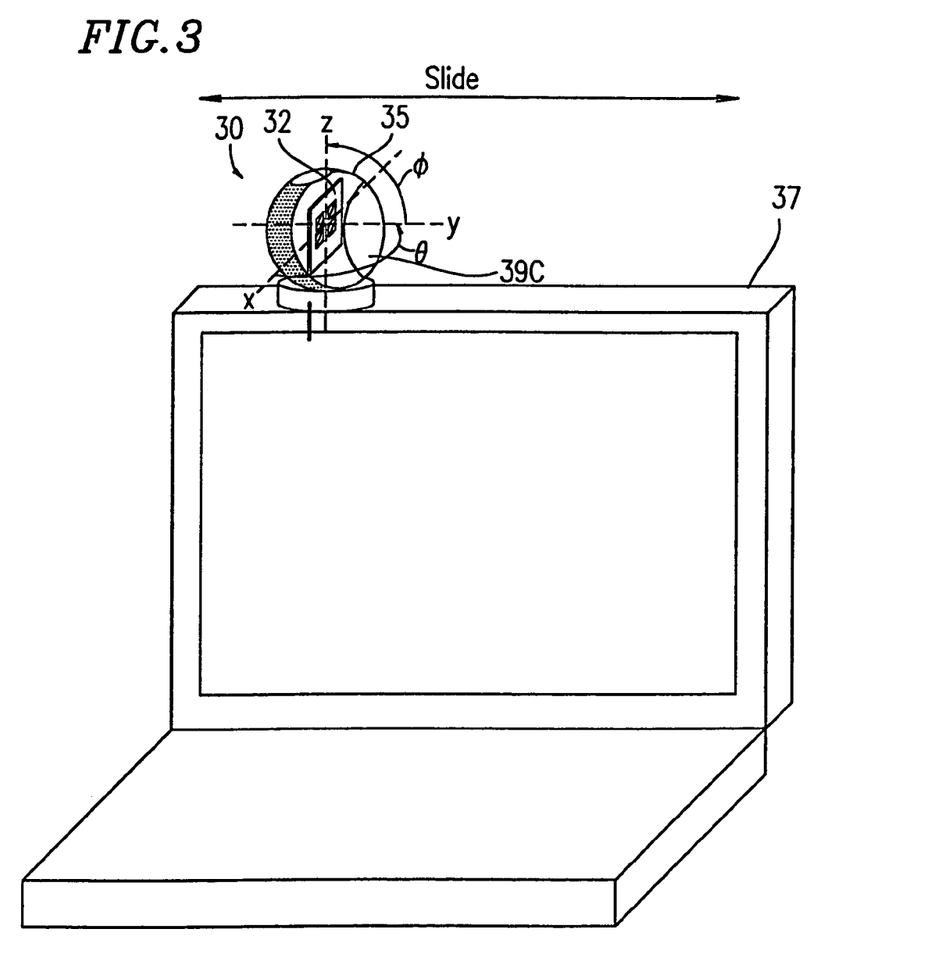
FIG. 3 shows the radiocommunication apparatus shown in FIG. 2A, which is attached to a notebook type personal computer.

FIG. 3 shows the radiocommunication apparatus 30 according to embodiment 2, which is attached to a notebook type personal computer 37 having a TV tuner card for the ground wave television broadcasting, etc. When the radiocommunication apparatus 30 is attached to the notebook type personal computer 37, a television receiver apparatus, etc., the direction of the flat antenna 32 can be adjusted by rotating the dielectric case 35. Therefore, it is not necessary to move the computer 37, the television receiver apparatus, etc. Furthermore, the radiocommunication apparatus 30 may be supported on the computer 37 such that the radiocommunication apparatus 30 itself can be horizontally moved (e.g., slid), for example, in the direction of an arrow shown in FIG. 3.

Figure 4:
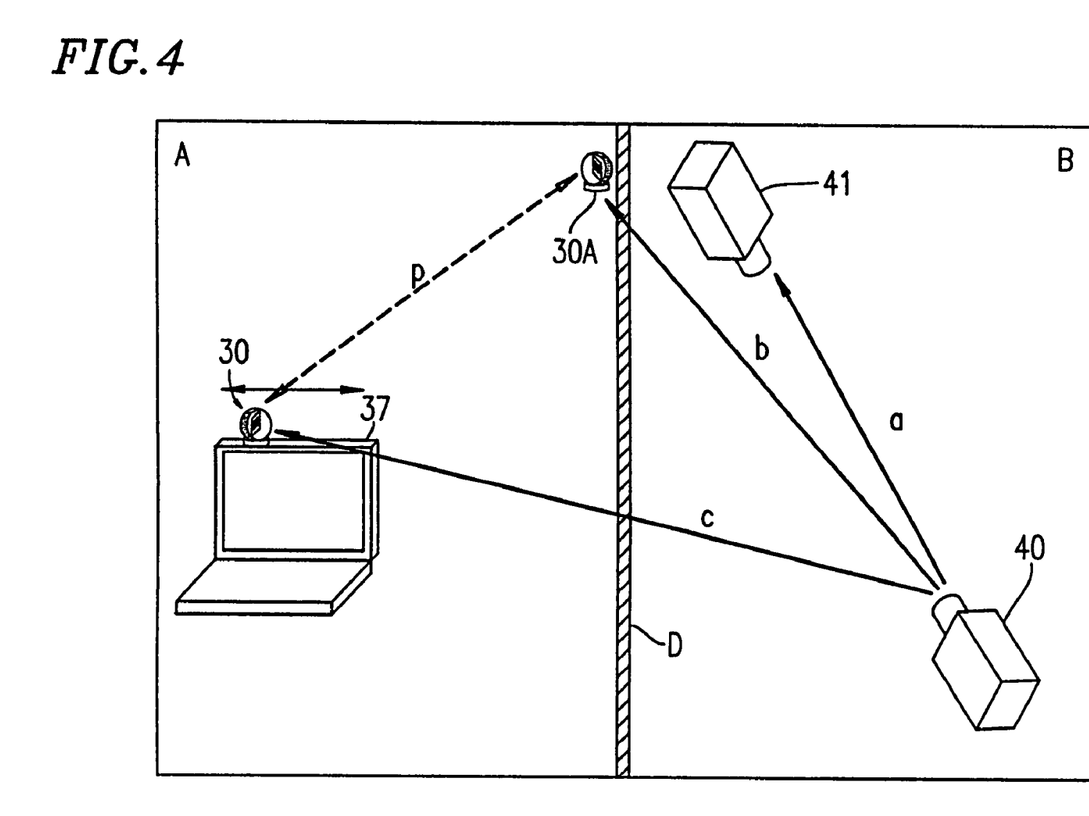
FIG. 4 shows an exemplary application of the radiocommunication apparatus shown in FIG. 2A.

FIG. 4 shows the radiocommunication apparatus 30 attached to the computer 37 and another radiocommunication apparatus 30A (having substantially the same structure as that of the radiocommunication apparatus 30) attached to a high place of a room A.

The radiocommunication apparatus 30A attached to the high place preferably includes an electric motor 39A for rotating the dielectric case 35 and a control section 39B for controlling the electric motor 39A in the turntable 36 (see also FIG. 2B). When a control signal is transmitted from a remote controller of the television receiver apparatus or the video recorder to the control section 39B in the turntable 36, the control section 39B controls the electric motor 39A in response to the control signal in order to rotate the dielectric case 35. Alternatively, in place of the remote controller, a cordless telephone, a handyphone (e.g., a PHS (personal handyphone system)), or the like, may provide the control signal for controlling the electric motor 39A. Alternatively, any other control device may be used for controlling and/or driving the electric motor 39A.

Next, an anti radio interference function of the radiocommunication apparatus 30 according to embodiment 2 will be described with reference to FIG. 4.

As an example, assume the case where the radiocommunication apparatus 30A at the high place transmits a signal, and the radiocommunication apparatus 30 of the computer 37 receives the signal from the radiocommunication apparatus 30A. Furthermore, in a neighboring room B, communications are performed between other transmitting/receiving terminals 40 and 41 using a milli-wave band signal.

Furthermore, assume that the frequency used for communications between the radiocommunication apparatus 30 and 30A is the same as that used for communications between the transmitting/receiving terminals 40 and 41. When a wall D between the rooms A and B is made of a thin laminated wood, a plaster board, or the like, the milli-wave band signal is transmitted through the wall D, whereby unnecessary transmission routes b and c are made. Accordingly, a radio signal from the transmitting/receiving terminal 40 or 41 in the room B is received by the radiocommunication apparatus 30 of the notebook type personal computer 37 in the room A, thereby causing radio interference or radio wave interruption in the radiocommunication apparatus 30.

In such a case, the dielectric case 35 of the radiocommunication apparatus 30 of the notebook type personal computer 37 is rotated by a fingertip, thereby adjusting the direction of the flat antenna 32 of the radiocommunication apparatus 30. On the other hand, a control signal is transmitted from the remote controller to the radiocommunication apparatus 30A at a high place in order to rotate the dielectric case 35 of the radiocommunication apparatus 30A by the electric motor, thereby adjusting the direction of the flat antenna 32 of the radiocommunication apparatus 30A. The adjustments of the flat antennas 32 of the radiocommunication apparatus 30 and 30A are made such that a transmission route p (broken line) for radio signals, which is less susceptible to effects of radio signals from the transmitting/receiving terminal 40 or 41 and in which the possibility of radio interference is small, are set between the radiocommunication apparatus 30 and 30A.

Alternatively, the direction of the flat antenna 32 may be adjusted after the notebook type personal computer 37 has been moved to a desired position, thereby setting a transmission route p in which radio interference is unlikely to occur. In this case, a setting range for the transmission route p becomes larger, and radio interference and radio wave interruption are therefore avoided in a more certain manner.

When the radiocommunication apparatus 30 is attached to an equipment such as a large size display apparatus, a personal computer, or the like, and it is accordingly difficult to move the entire equipment to a desired position, a sliding function for supporting the radiocommunication apparatus 30 such that the radiocommunication apparatus 30 can be moved in the horizontal direction may be provided for adjusting the position of the radiocommunication apparatus 30.

Furthermore, in the radiocommunication apparatus 30, at the back face side of the flat antenna 32, a wall surface of the dielectric case 35 is covered with a metal element 38 as shown in FIG. 2A. In such a structure, the ratio of the directivity of the front side to that of the backside of the flat antenna 32 is high. Therefore, even when unwanted radio signals reach the radiocommunication apparatus 30 through, for example, the transmission route C, the unwanted radio signals are blocked by the metal element 38 of the dielectric case 35, thereby reducing effects of radio interference.

When radio interference occurs, and an appropriate image accordingly cannot be reproduced on a display screen of the notebook type personal computer 37 in spite of the above-described measure, the transmission system becomes easier for the user to operate by providing the system with a mechanism for displaying on the display screen of the computer 37 a message, "Radio interference occurred. Adjust the direction of the flat antenna", or the like.

As described above, according to embodiment 2, effects of radio interference by other radiocommunication apparatus can be avoided by adjusting the direction of the flat antenna 32 having the directivity.

In embodiment 2, the transmitter 1 and the receiver 21 shown in FIG. 1 may be employed in place of the transmitting/receiving device 33 of embodiment 2. In this case, the local oscillator and the light receiving/signal processing section are shared between the transmitter 1 and the receiver 21. For example, when effects of radio interference cannot be reduced by adjusting the direction of the flat antenna 32, a current channel for the radio signal between the transmitting/receiving devices 33 of the radiocommunication apparatus 30 and 30A is switched by a remote controller 14 to a channel for preventing radio interference.

Although the milli-wave band video multiplex transmission is used as an example for describing embodiment 2, the present invention is applicable to a microwave band transmission, or a high-speed radio LAN apparatus or a high-speed radio access terminal apparatus.

Furthermore, a horn antenna may be employed in place of the flat antenna and integrated with the transmitting/receiving device. The transmitting/receiving device including the horn antenna integrated therewith may be contained in the dielectric case 35.

Furthermore, as show in FIG. 3, at the side of a radio wave receiving face of the flat antenna 32, a portion of the dielectric case 35 may be provided with a low-loss dielectric 39C (e.g., a glass lens as a dielectric lens), thereby increasing the antenna gain of the flat antenna 32. With such a structure, the high antenna gain can be obtained without fail regardless of the direction of the flat antenna 32.

As a matter of course, the radiocommunication apparatus 30A is not limited to the above-described example, and can be carried into practice in various forms.

Figure 5:
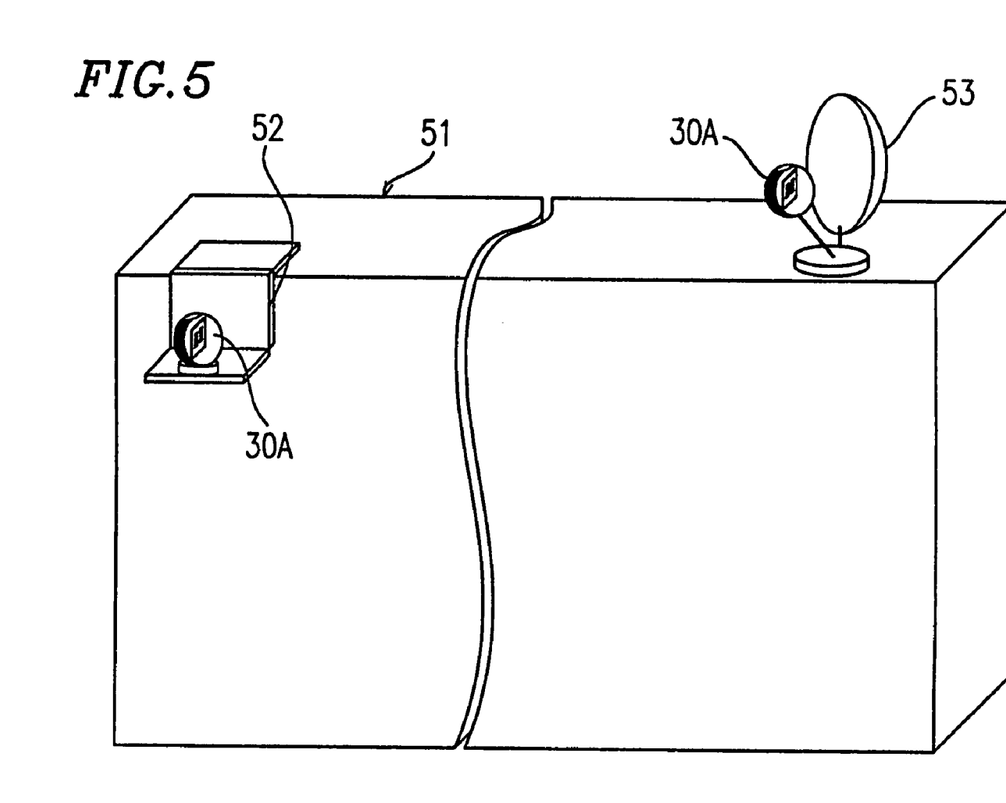
FIG. 5 shows how to attach the radiocommunication apparatus shown in FIG. 2A to an air conditioner.

For example, the radiocommunication apparatus 30A may be attached to an adaptor 52 fixed to an air conditioner 51 as shown in FIG. 5.

Alternatively, a parabolic antenna 53 including the radiocommunication apparatus 30A attached thereto may be mounted on the air conditioner 51.

The parabolic antenna 53 reflects radio waves such that the radio waves converge at the flat antenna 32. When the transmission distance of radio signals is long, the radio signals are transmitted through a wall between adjoining rooms, or radio signals are transmitted between a first floor and a second floor, a satisfactory transmission quality can be easily obtained by using the parabolic antenna 53 having the high gain.

Figure 6:
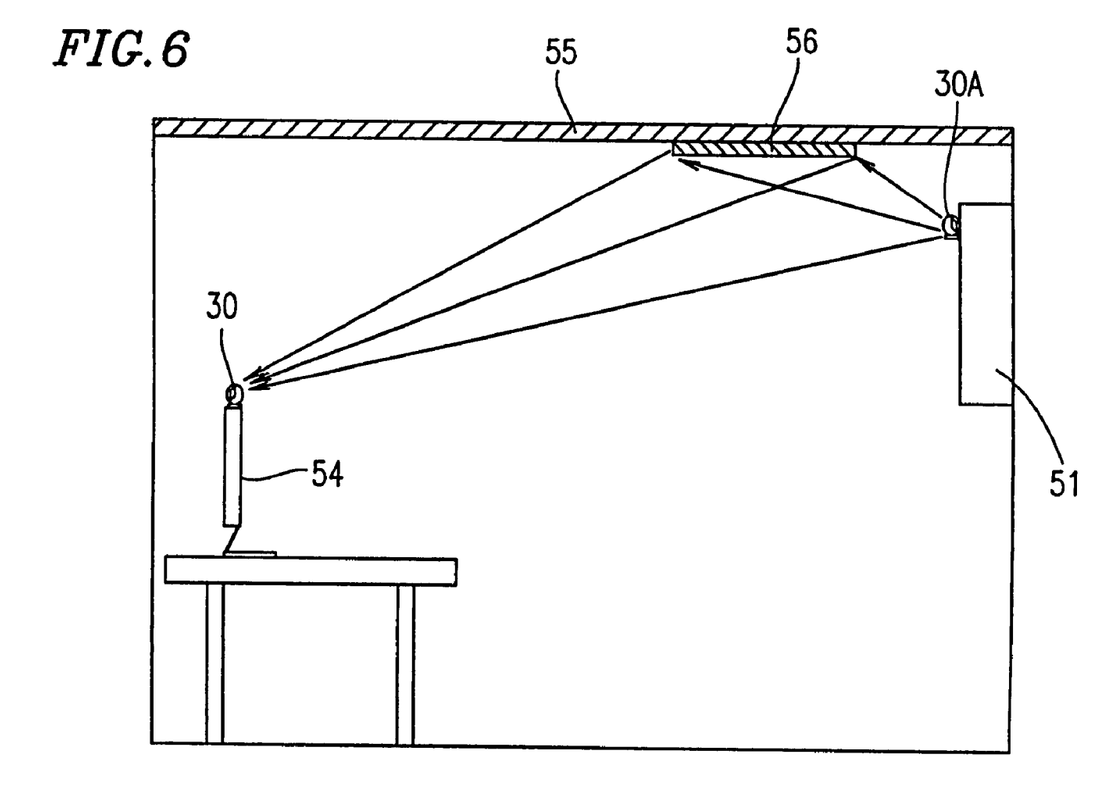
FIG. 6 shows another exemplary application of the radiocommunication apparatus shown in FIG. 2A.

As shown in FIG. 6, the radiocommunication apparatus 30A is attached to the air conditioner 51, and the radiocommunication apparatus 30 is attached to the display apparatus 54. Herein, assume the case where the radiocommunication apparatus 30A of the air conditioner 51 transmits a radio signal, and the radiocommunication apparatus 30 of the display apparatus 54 receives the radio signal from the radiocommunication apparatus 30A.

The air conditioner 51 is typically installed at a high place on a wall of a room, and the radiocommunication apparatus 30A accordingly radiates a radio signal from the high place to a lower place. With such a configuration, the radiocommunication apparatus 30 of the display apparatus 54 can easily receive the radio signal from the radiocommunication apparatus 30A of the air conditioner 51.

The radiocommunication apparatus 30A is attached to a face of the air conditioner 51 which is apart from the wall of the room, as shown in FIG. 6. Therefore, comparing with the case where the radiocommunication apparatus 30A is directly attached to the wall of the room, a satisfactory transmission route can be obtained because the radio signal on its way to the radiocommunication apparatus 30A is not blocked by obstacles attached to or extending from the wall, such as decorations, etc. Thus, effects of radio interference due to an unwanted electromagnetic wave coming from a direction other than that of the radio signal coming to the radiocommunication apparatus 30A can be reduced.

Furthermore, when the radiocommunication apparatus 30A is installed at a high place in the room, a radio signal transmitted from the radiocommunication apparatus 30A may be reflected by a ceiling 55 of the room prior to the reception by the radiocommunication apparatus 30 attached to the display apparatus 54. In this case, since the radiocommunication apparatus 30A is present near the ceiling 55, the strength per unit area of the radio signal incident on the reflection surface is large, and the reflected radio signal is also strong. Furthermore, comparing with the case where a radio signal is radiated from a low place and reflected by the ceiling, a small reflection area is enough to reflect the radio wave. Therefore, a reflecting plate 56 made of a conduction plate such as an aluminum foil, a metal mesh whose mesh is patterned at a pitch substantially equal to or finer than the wavelength of the radio signal, or the like, may be provided on the ceiling 55, thereby improving the reflectance of the radio wave.

As described above, in addition to the direct transmission route for the radio signal from the transmitter to the receiver, another transmission route using the reflection by the ceiling 55 or the reflecting plate 56 can be obtained. This arrangement can reduce effects of radio interference due to a foreign radio wave having the same frequency as that of a channel used for the signal transmission.

Furthermore, a rotating function for rotating the reflecting plate 56 may be additionally provided, and the direction of the reflecting plate 56 may be controlled by the remote controller, thereby adjusting the reflecting direction of the radio wave. With such an C arrangement, effects of radio interference can be reduced.

Furthermore, the air conditioner 51 is typically installed on a wall in the vicinity of a window, and releases warm air or cool air into the room. Similarly, the radiocommunication apparatus 30A radiates a radio wave into the room. Therefore, the leakage of the radio wave out to the window can be reduced, thereby weakening effects of radio interference on electronic equipment in other houses. In addition, in the vicinity of the air conditioner, a hole is formed in the wall for a pipe or a power cord connected to an outdoor equipment of the air conditioner. Through the hole, an antenna cable for receiving information signal from the outside of the house and passing the received information signal to the radiocommunication apparatus 30A of the air conditioner 51 can be provided together with the pipe and/or the power code. Thus, a large scale construction is not required for installing the radiocommunication apparatus 30A.

Furthermore, an adaptor that enables the detachable attachment of the radiocommunication apparatus 30A to the air conditioner 51 is desirable as the adaptor 52. Furthermore, the room temperature is maintained constant by the air conditioner 51, and the environmental temperature of the radiocommunication apparatus 30A is therefore maintained generally constant. Thus, an electronic circuit of the radiocommunication apparatus 30A can stably operate.

As described above, according to the present invention, in the radio-frequency radiocommunication apparatus including a transmitter and a receiver, the transmitter includes a local oscillation means for switching and outputting a local oscillation signal having any of a plurality of frequencies, a frequency mixing means for mixing the local oscillation signal from the local oscillation means of the transmitter and an input signal received from the outside of the transmitter in order to form a transmission signal. On the other hand, the receiver includes a local oscillation means for switching and outputting a local oscillation signal having any of a plurality of frequencies, a frequency mixing means for mixing the local oscillation signal from the local oscillation means of the receiver and an input signal received from the outside of the receiver in order to form an output signal. The frequency of the local oscillation signal from the local oscillation means of the transmitter and the frequency of the local oscillation signal from the local oscillation means of the receiver are each switched so as to be identical to each other. The local oscillation frequencies are switched in such a manner to select any of a plurality of channels, and a communication can be established between the transmitter and the receiver through the selected channel. For example, since the milli-wave band is a wide band, a number of channels can be set within the milli-wave band. Thus, radio interference can be prevented by selecting an optimum channel among the number of channels.

Furthermore, according to the present invention, the transmitter and the receiver each receive a control signal from outside, and switch the frequency of the local oscillation signal to be output from the local oscillation means based on the received control signal. The control signal from outside may be obtained from a remote controller of, e.g., a television receiving apparatus or a handyphone. The frequency of the local oscillation signal is switched by utilizing the control signal.

Furthermore, a radio-frequency radiocommunication apparatus according to the present invention includes a directional antenna including a transmitter or a receiver integrated therewith, a dielectric case for containing the directional antenna, and a supporting means for supporting the dielectric case such that the direction of the directional antenna can be freely adjusted. When themilli-wavebandisutilized, for example, the size and the weight of the transmitting/receiving device can be reduced.

Accordingly, the transmitting/receiving device can be integrated with a directional antenna. According to the present invention, the directional antenna is contained in the dielectric case, and the direction of the directional antenna thus can be changed by changing the direction of the dielectric case. Thus, the directional antenna can be directed to a direction less susceptible to effects of radio interference by changing the direction of the dielectric case by the fingertip. Furthermore, when a radio signal is transmitted between two radio-frequency radiocommunication apparatus, a transmission route for the radio signal can be easily changed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A radiocommunication apparatus, comprising:
   a directional antenna;
   a dielectric case for containing the directional antenna; and
   a supporting section for supporting the dielectric case such that a direction of the dielectric case can be changed
   wherein the directional antenna comprises one or more antenna elements on a dielectric substrate and further comprises a transmitter and/or a receiver on one side of the dielectric substrate, and
   wherein a portion of the dielectric case which faces a back face of the directional antenna opposite to a radio wave receiving face thereof is made of a metal.

2. A radiocommunication apparatus according to claim 1, wherein the transmitter comprises:
   a first local oscillation section for selecting a frequency for a first local oscillation signal from a plurality of predetermined frequencies in order to output the first local oscillation signal; and
   a first frequency mixing section for mixing an input signal and the first local oscillation signal, thereby forming a transmission signal.

3. A radiocommunication apparatus according to claim 1, wherein the receiver comprises:
   a second local oscillation section for selecting a frequency for a second local oscillation signal from a plurality of predetermined frequencies in order to output the second local oscillation signal; and
   a second frequency mixing section for mixing a received signal and the second local oscillation signal, thereby forming an output signal.

4. A radiocommunication apparatus according to claim 1, comprising a lock section for locking the direction of the dielectric case.

5. A radiocommunication apparatus according to claim 1, wherein the transmitter has a plane circuit or a dielectric waveguide.

6. A radiocommunication apparatus according to claim 1, wherein the receiver has a plane circuit or a dielectric waveguide.

7. A radiocommunication apparatus according to claim 1, wherein
   the driving section includes a control section; and
   the control section receives a control signal from outside, and the driving section changes the direction of the dielectric case under the control of the control section based on the control signal.

8. A radiocommunication apparatus according to claim 1, wherein a portion of the dielectric case which faces a radio wave receiving face of the directional antenna is provided with a dielectric lens.

9. A radiocommunication apparatus according to claim 1, wherein the radiocommunication apparatus is attached to a display apparatus or an air conditioner.

10. A radiocommunication apparatus according to claim 1, wherein the directional antenna includes a transmitter and a receiver integrated therein.

11. A radiocommunication apparatus according to claim 1, wherein the dielectric case completely encloses the directional antenna.

12. A radiocommunication apparatus according to clam 1, wherein the supporting section includes a driving section for changing the direction of the dielectric case.

* * * * *